(12) United States Patent
Baiden et al.

(10) Patent No.: US 10,204,514 B2
(45) Date of Patent: Feb. 12, 2019

(54) OMNIDIRECTIONAL OPTICAL WIRELESS COMMUNICATIONS RECEIVER AND SYSTEM

(71) Applicant: Penguin Automated Systems Inc., Naughton (CA)

(72) Inventors: Gregory Baiden, Naughton (CA); Alberto Rui Frutuoso Barroso, Sudbury (CA)

(73) Assignee: Penguin Automated Systems Inc., Naughton, Ontario (CA)

( * ) Notice: Subject to any disclaimer, the term of this patent is extended or adjusted under 35 U.S.C. 154(b) by 0 days.

(21) Appl. No.: 15/561,364

(22) PCT Filed: Mar. 24, 2016

(86) PCT No.: PCT/CA2016/050354
§ 371 (c)(1),
(2) Date: Sep. 25, 2017

(87) PCT Pub. No.: WO2016/154742
PCT Pub. Date: Oct. 6, 2016

(65) Prior Publication Data
US 2018/0082578 A1    Mar. 22, 2018

Related U.S. Application Data

(60) Provisional application No. 62/139,008, filed on Mar. 27, 2015.

(51) Int. Cl.
*H04B 10/00*     (2013.01)
*G08C 23/06*     (2006.01)
*G01J 1/04*      (2006.01)
*G05D 1/00*      (2006.01)
*H04B 10/2575*   (2013.01)

(52) U.S. Cl.
CPC ............ *G08C 23/06* (2013.01); *G01J 1/04* (2013.01); *G01J 1/0425* (2013.01); *G05D 1/0022* (2013.01); *G05D 2201/0207* (2013.01); *H04B 10/25752* (2013.01)

(58) Field of Classification Search
CPC .......... G08C 23/06; G01J 1/0425; G01J 1/04; H04B 10/25752; G05D 1/0022; G05D 2201/0207
USPC ..................................................... 398/113
See application file for complete search history.

(56) References Cited

U.S. PATENT DOCUMENTS

| 4,143,368 A * | 3/1979 | Route ............. B60R 25/1001 340/426.17 |
| 5,109,446 A * | 4/1992 | Kaltschmidt ......... G02B 6/122 385/132 |
| 5,235,660 A | 8/1993 | Perry et al. |

(Continued)

*Primary Examiner* — M. R. Sedighian
(74) *Attorney, Agent, or Firm* — DLA Piper LLP (US)

(57) ABSTRACT

A wireless optical communication receiver is provided. The optical receiver includes an arrangement of wavelength shifting fibers preferably encased within a protective shroud. The wavelength shifting fibers provide an efficient method for capturing photons of light that strike them. Photons may strike the fibers as they first pass through a clear lens in the shroud or may strike the fibers after they are concentrated and focused by an embedded ring or hyperbolic mirror. The wireless optical receiver may be attached to a mobile vehicle in order to facilitate teleoperation of that vehicle.

14 Claims, 13 Drawing Sheets

(56) References Cited

U.S. PATENT DOCUMENTS

| | | |
|---|---|---|
| 6,185,353 B1 | 2/2001 | Yamashita et al. |
| 7,953,326 B2 | 5/2011 | Farr et al. |
| 7,956,340 B2 | 6/2011 | Vonmetz et al. |
| 2007/0047962 A1* | 3/2007 | Hirano ............... G02B 6/02028 398/141 |

* cited by examiner

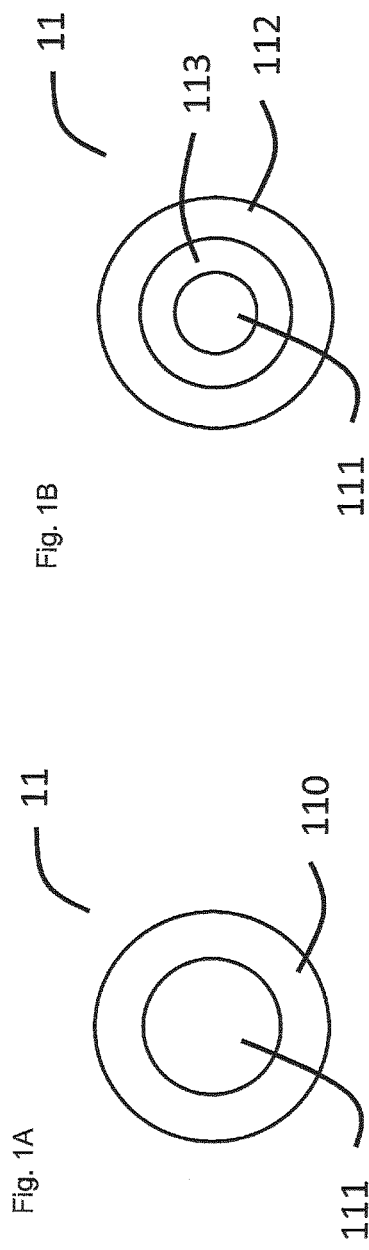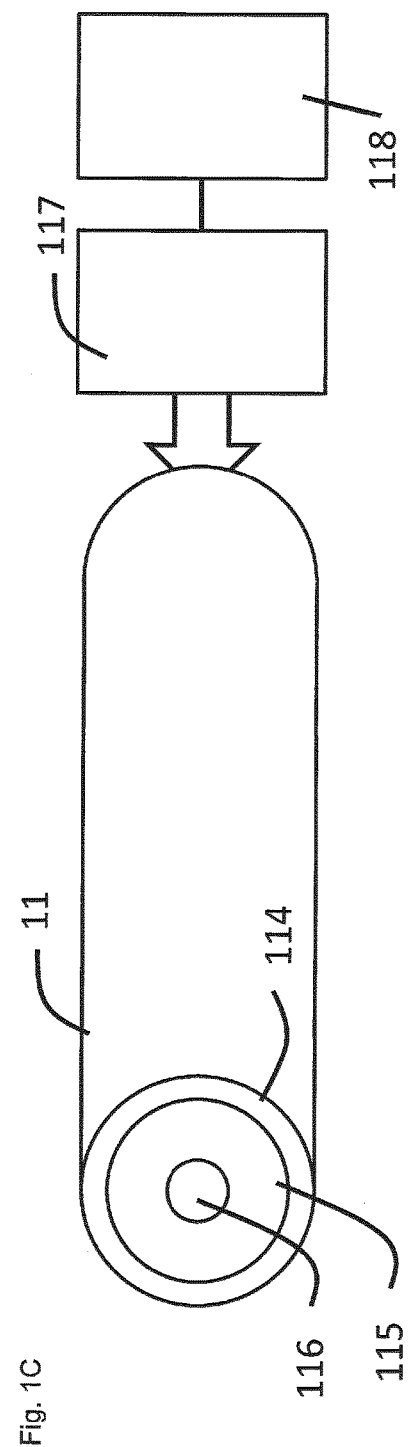

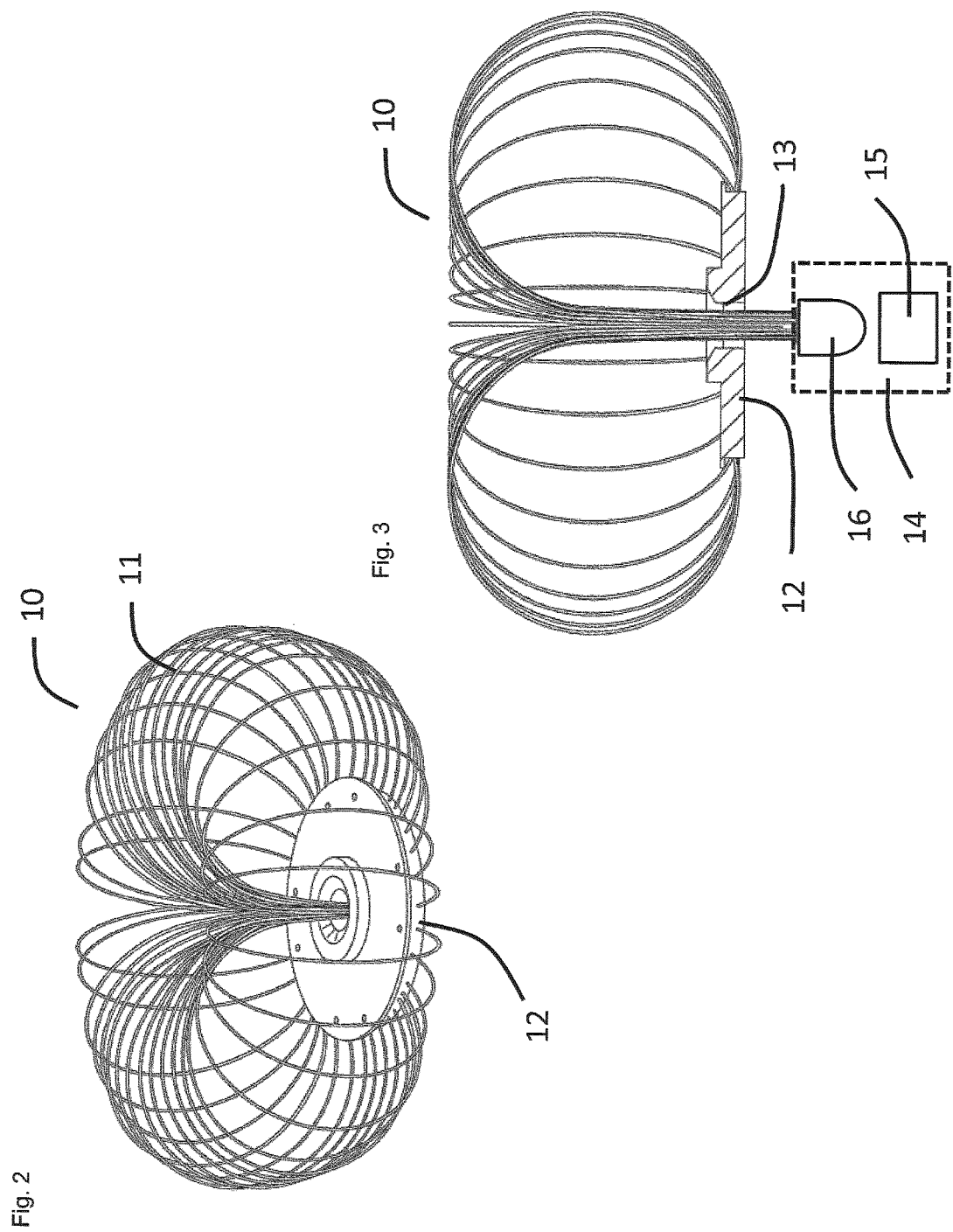

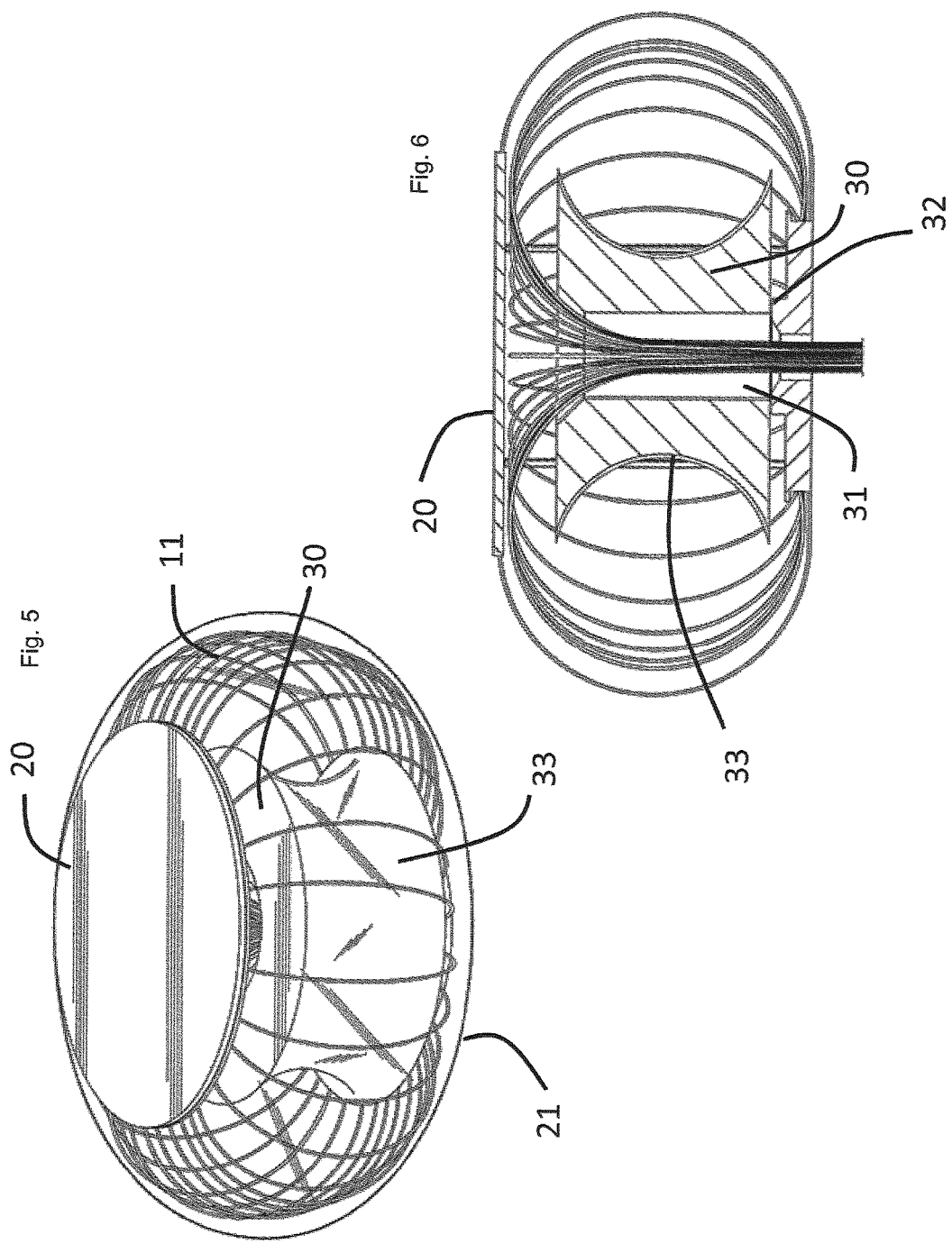

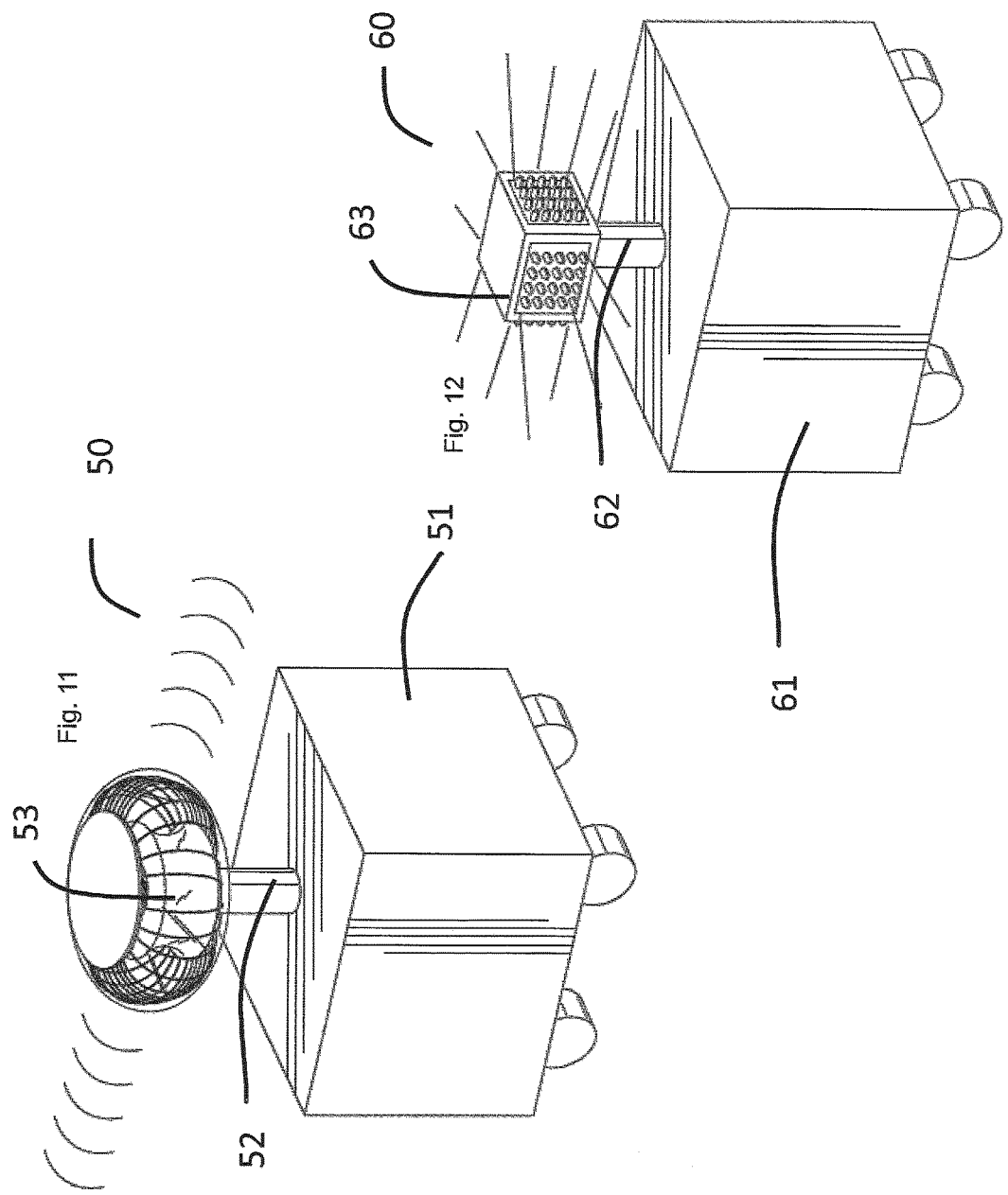

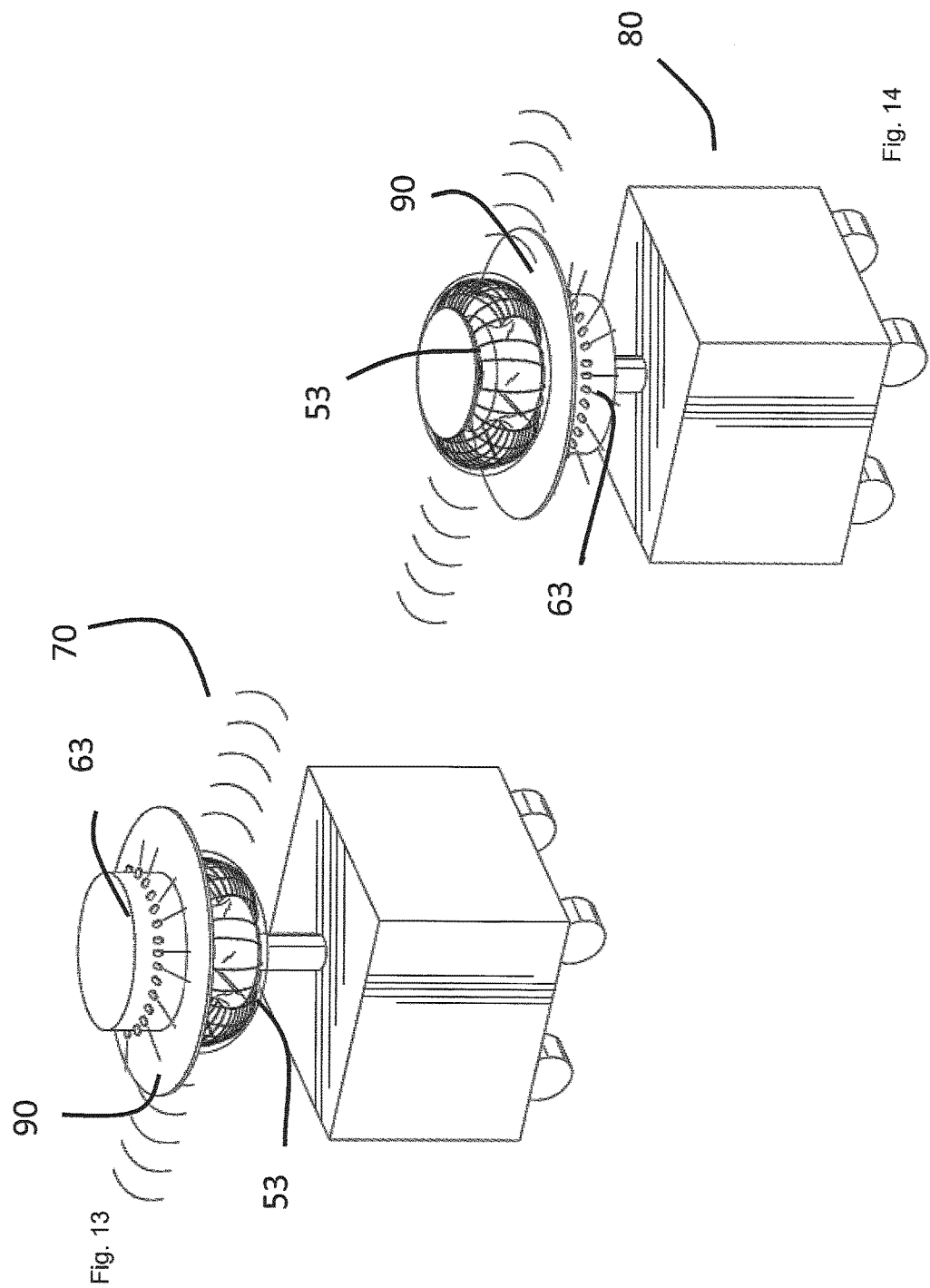

OMNIDIRECTIONAL OPTICAL WIRELESS COMMUNICATIONS RECEIVER AND SYSTEM

BACKGROUND

1. Technical Field

The present disclosure relates to communication devices and, in particular, optical communication receivers.

2. Description of the Related Art

The depletion and scarcity of high-grade mineral deposits in locations with dry land access is forcing the natural resources industry to look for alternate sources to assist in sustainable worldwide economic growth. Underwater and space (near-Earth objects) are two of the next exploration frontiers. However, both environments are generally unfavourable to human workers.

One solution for work to be carried out in these environments has been to replace the physical presence of a human worker with a robotic tool guided by the worker from a remote location, commonly referred to as teleoperation. For this to be feasible, high bandwidth communication is required, and wireless high bandwidth communication is preferred.

However, the electromagnetic spectrum below 3 THz is currently allocated to diverse radio communications services, requiring use of the spectrum below ionizing radiation frequencies to implement more services and provide more bandwidth. As an alternative, optical wireless communication (OWC) may be used, which offers important advantages over standard RF communication systems, having potential bitrates above multiple Terabit/s in space, atmosphere and underwater environments.

For optical communications, a suitable receiver capable of receiving an optical signal and a suitable transmitter capable of transmitting an optical signal are required. Most commercial optical receivers are relatively delicate instruments that typically require close alignment with a transmitter for the desired communication. These optical receivers are generally not suitable for industrial or hazardous applications where environments tend to require more robust systems capable of adapting to the dynamic influences that the teleoperated vehicle or robot is likely to encounter in locations that are less hospitable to human presence.

BRIEF DESCRIPTION OF THE DRAWINGS

In drawings that illustrate by way of example only embodiments of the present disclosure, in which like reference numerals describe similar terms throughout the various figures, FIGS. 1A, 1B and 1C are sectional views of different types of wavelength shifting fibres.

FIG. 2 is an isometric view of an example optical sensor comprising wavelength shifting fibres.

FIG. 3 is a front sectional view of the example optical sensor of FIG. 1.

FIG. 5 is an isometric view of an example optical sensor encased in a shroud along with an a ring mirror embedded therein FIG. 6 is a front sectional view of an example optical sensor encased in a shroud along with a ring mirror embedded therein.

FIG. 11 is an isometric view of a robot with an example optical receiver.

FIG. 12 is an isometric view of a robot with an example optical emitter.

FIG. 13 is an isometric view of a robot with both an optical receiver and emitter, the emitter placed above and shielded from the receiver.

FIG. 14 is an isometric view of a robot with both an optical receiver and emitter, the receiver placed above and shielded from the emitter.

DETAILED DESCRIPTION

Figure 4:
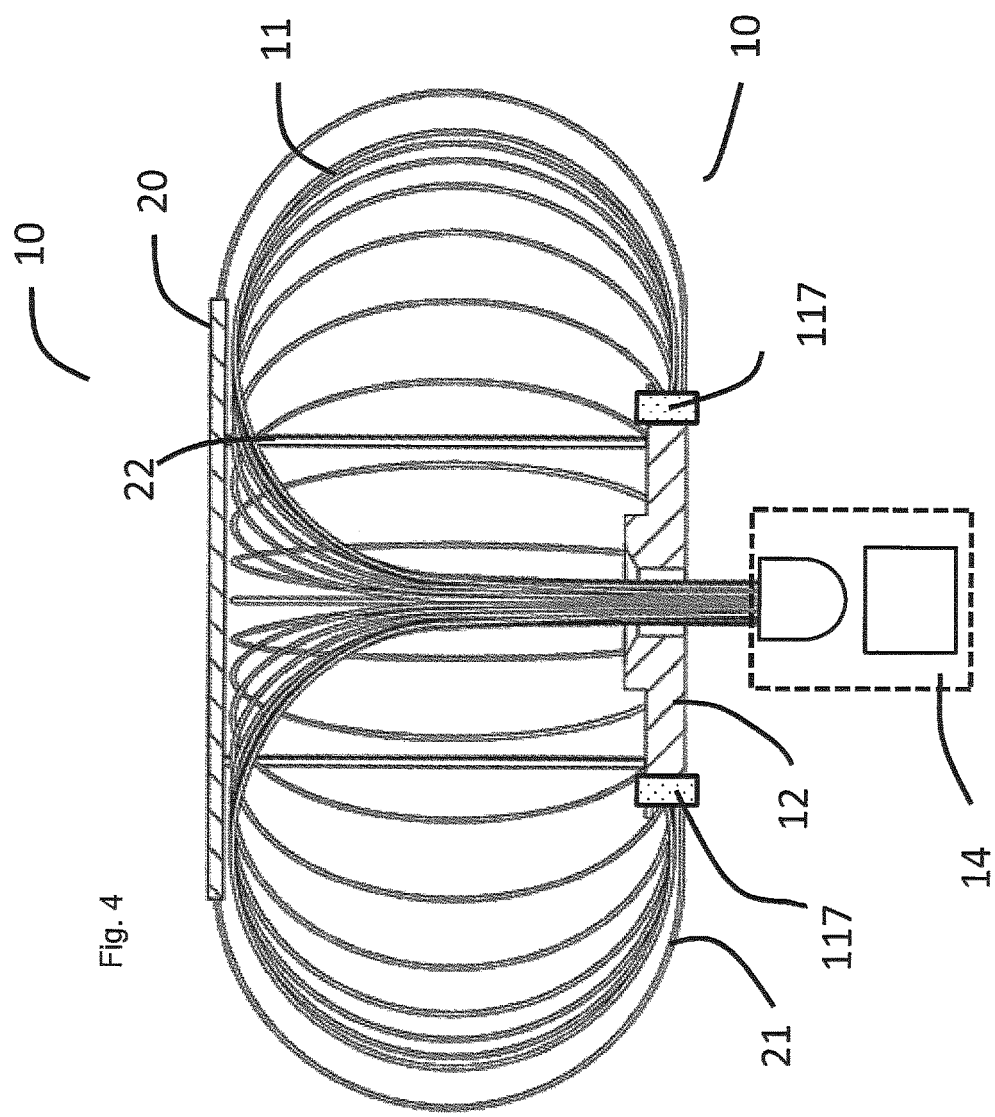
FIG. 4 is a front sectional view of an example optical sensor encased in a shroud.

Leaky feeder (radiant coaxial cable) is typically the most prevalent communications infrastructure present in underground mines, but this infrastructure is often not installed in temporary areas like ore body fronts, block caving draw bells and room & pillar zones. Further, for the use of leaky feeder communication, the cable must first be installed in the location—which typically precludes such use in environments that are being explored for the first time or entered for the first time after becoming inhospitable for humans. Diverse wireless systems working in bands from Very High Frequencies (VHF) to microwave are often used in zones not covered by the leaky feeder; however, multiple studies have shown that the teleoperation of mining equipment in underground and underwater environments using those bands is not reliable.

Models characterizing Wireless Underground Communications Networks (WUCNS) in tunnels and room & pillar areas suggest that intense attenuation and fluctuations exist in the near region, and that the tunnel size and antenna positioning are critical (see, for example: I. F. Akyildiz, Z. Sun, and M. C. Vuran, "Signal propagation techniques for wireless underground communication networks," *Physical Communication*, vol. 2, no. 3, pp. 167-183, 2009).

The lack of network reliability limits the teleoperation of mining equipment. Studies measuring path losses above 85 dB at 20 meters distances in tunnels with 25 cm of surface irregularities have concluded that 2.4 GHz gives more network availability than 5.8 or even 60 GHz systems (see, for example: N. Hakem, G. Delisle, and Y. Coulibaly, "Radio-wave propagation into an underground mine environment at 2.4 ghz, 5.8 ghz and 60 ghz," in *Antennas and Propagation (EuCAP), 2014 8th European Conference on*, April 2014, pp. 3592-3595).

RF performance in underwater communications is often more limited, forcing the use of low frequencies, magnetic induction, acoustic communications, Laser OWC or hybrid (acoustic-OWC) systems.

In one embodiment provided is a photon detecting apparatus comprised of at least one fibre. The fibre itself comprises an elongated an elongated transparent core with a first refractive index, an elongated wavelength shifting material with a second refractive index coaxial with and surrounding the transparent core, an elongated cladding with a third refractive index coaxial with and surrounding the wavelength shifting material. The first refractive index is greater than the second refractive index which is greater than the third refractive index.

In a further embodiment provided also is photon detecting apparatus further comprising a lens assembly and a support base with an aperture formed in the support base wherein at least one fibre is attached at its first end to an outer edge of the support base, the at least one fibre extends from its point of attachment away from the support base, loops back towards the support base, passing through the aperture formed in the support base and is optically connects to the lens assembly, thereby forming a toroid shape. In this embodiment provided also may be a concave ring mirror containing a central bore coaxial with the aperture wherein the at least one fibre passes through the bore prior to passing through the aperture in the support base.

In a further embodiment provided is a photon detecting apparatus with a support base with an aperture formed in the support base, a concave ring mirror containing a central bore, coaxial with the aperture, a lens assembly, and at least one vane connected to and extending outwardly from an outer surface of the ring mirror, the at least one vane positioned with a space therein at a focus point of the ring mirror to allow the at least one fibre to pass therethrough, wherein the at least one fibre is attached at its first end to an outer edge of the support base, the at least on fibre extending from its point of attachment and passing through the at least one space in the vane and circumnavigating the ring mirror at its focal point, passing through the central bore of the ring mirror and through the aperture in the support base, the second end of the at least one fibre connected to the lens assembly.

In a further embodiment, the lens assembly of the photon detecting device may comprise a compound parabolic concentrator (CPC) optically connected to the at least one fibre at an input surface and optically connected at an output surface to a photodetector.

In any of the embodiments described above, the fibres of the photon detecting device may be optically connected to at least one pumping light source that emits light. The pumping light source may be attached to the outer edge of the support base. In this embodiment a filter material may be placed between the CPC and the at least one fibre. The filter material may block at least some of the light pumped from the at least one pumping light source.

In a further embodiment, provided is a photon detecting apparatus that further comprises a cap and a transparent lens affixed to the cap and the support base. The cap, lens and support base together protect the at least one fibre of the photon detecting apparatus. The cap may be transparent. Attached to the cap may also be a hyperbolic mirror capable of concentrating and focusing photons received through the transparent lens at the at least one fibre.

In a further embodiment, provided is a photon detecting apparatus wherein the fibres are arranged in bundles, which are attached substantially near the centre of a flat or concave support base, and extend in a spiral arrangement outwardly therefrom.

In a further embodiment, the photon detecting device is attached to a mobile vehicle for the teleoperation of that vehicle. The mobile vehicle may be any one of a submarine, an airplane and a wheeled vehicle.

In a further embodiment provided is a method of teleoperating a mobile vehicle using light encoded with one or more instructions comprising capturing the light in at least one fibre wherein the fibre comprises an elongated transparent core with a first refractive index; an elongated wavelength shifting material with a second refractive index coaxial with and surrounding the transparent core; an elongated cladding with a third refractive index coaxial with and surrounding the wavelength shifting material. The first refractive index of is greater than the second refractive index which is greater than the third refractive index, which allows for captured photons to remain captured within the fibre. The method further comprising concentrating light from the at least one fibre with a compound parabolic concentrator, which is optically connected to the at least one fibre; detecting the light by a photodetector optically coupled to the compound parabolic concentrator; converting variations in the light to an electrical signal and detecting one or more instructions; operating on the one or more instructions by the mobile vehicle.

An optical wireless communications system for remote operation of mobile equipment will be described. The communications system uses an integrated OWC Circuit (IO-WCC) was used and was preferred over the conventional BIAS-T LED modulation. Wavelength shifting fibres (WS) are also used to design high gain 450 nm sensitive omnidirectional free space optical (FSO) receivers for the system to receive light signals from a multitude of directions for data transmission using optical signals.

There are several types of WS fibres that may be used for a receiver in an optical wireless communications system. Specifically, the fibres may be of a single cladding type, a multiple cladding type, or may be a triaxial type with a transparent core and with either a single or multiple cladding. Regardless of the fibre type, each fibre has a refractive index on its outer layer(s) that is lower than the refractive index of its inner layer(s) in order for total internal reflection of light to take place. Total internal reflection allows for the capture of photons within the WS fibres and transmit the photons, and with them signal information, along the fibre.

Referring now to FIGS. 1A, 1B and 1C, provided are sectional views of different types of WS fibres 11. FIG. 1A shows a sectional view of a WS fibre 11 employing a single optical cladding 110 arranged coaxially with a wavelength shifting core 111. FIG. 1B shows a sectional view of a WS fibre 11 employing a first cladding 112 arranged coaxially with a second cladding 113, as well as a wavelength shifting core 111. FIG. 1C shows a sectional view of a triaxial WS fibre 11. The triaxial WS fibre 11 comprises an outer optical cladding 114 arranged coaxially with and surrounding an internal wavelength shifting material 115, which itself is arranged coaxially with and surrounds an optically transparent core 116. In an alternative embodiment, the triaxial WS fibre may employ an inner and outer cladding instead of just the single cladding 114.

A wave length shifting material is a photofluourescent material that absorbs higher frequency photons with more energy and in turn emits lower frequency photons with less energy. Usually the material will absorb one high frequency photon and emit two or more lower frequency photons.

In an embodiment, the transparent core 116 of the triaxial WS fibre 11 may be made of polyimide, for example, with a refractive index of 1.7. The wavelength shifting material 115 surrounding the transparent core 116 may be made of polymethylmethacrilate with a refractive index of 1.6 for example. The outer optical cladding 114 may be made of acrylic and have a refractive index of 1.5 for example. In a triaxial WS fibre 11, the refractive index of the outer optical cladding is lower than the refractive index of the wavelength shifting material which in turn is lower than the refractive index of the transparent core. The transparent core 116 is particularly advantageous in that it increases the light transmission capabilities of the WS fibre 11. A triaxial WS fibre allows the implementation of more efficient longitudinal OWC systems in corridors, tunnels, underground mines, etc.

In an embodiment, the WS fibres 11 may be pumped using a pumping light source 117, which allows for optical amplification using stimulated Raman scattering. In such an embodiment, the triaxial WS fibre 11 is capable of receiving photons at any point on its length and is capable of converting and trapping them in the wavelength shifting material while the transparent core is stimulated with light at a higher frequency from the pumping light source 117. As an example, the direction of photon travel may be along the arrow noted in FIG. 1C, but, in any event, travels along the length of the WS fibre 11. The stimulation wavelength light pump 117 is connected to a programmable power supply 118, which is capable of controlling photon discharge from the pump. The power supply controlling the wavelength pump 117 allows it to emit light with the required power to adjust amplification gain in the stokes shift at is typically at a frequency of 13.3 THz.

Although FIG. 1C shows the wavelength pump 117 attached to a triaxial WS fibre 11, the triaxial fibre can be used without Raman pumping or the wavelength pump may be attached to any WS fibre 11 of FIGS. 1A and 1B to increase their gain. A single pump may be connected to multiple fibres.

FIG. 2 is an isometric view of an example optical sensor 10 comprising WS fibres 11. In this embodiment, the optical sensor 10 comprises a plurality of wavelength shifting (WS) fibres 11 of any type mentioned above capable of receiving light signals; however, it is preferable that triaxial fibres are used as their transmission capabilities are greater.

In the embodiment of FIG. 2, the WS fibres 11 are formed into the shape of a hollow toroid. The hollow or transparent fibre support toroid arrangement allows the active area of the WS fibres 11 from all toroid quadrants to capture photons that strike them from any direction. This preferably maximizes the optical receiver photon sensitive area.

FIG. 3 is a sectional front view of the optical sensor 10 of one embodiment. As can be seen in both FIGS. 2 and 3, a support base 12 may also be provided. In forming the toroid, the WS fibres 11, mounted in the support base 12, bound away from the support base and loop around to travel through an aperture 13 formed in the centre of the support base 12 and then to a detector such as a lens assembly 14. The WS fibres 11 may be substantially equally spaced around all or a portion of the support base 12. The support base 12 may provide structure to the WS fibres 11 and may further hold the light pump 117 to pump light through the fibres.

The lens assembly 14 may contain a compound parabolic concentrator (CPC) 16, which is optically connected, by one of its ends, to one end of the WS fibres 11, and by another of its ends to a photodetector 15. The CPC 16 may be optically connected to the WS fibres 11 and to the photodetector 15 by way of an optical gel or any other suitable optical connection. The CPC 16 may be refractive or reflective. For example, the CPC 16 may be a refractive piece of quartz crystal.

Photons captured within the WS fibres 11 travel along their lengths to the CPC 16. In turn, the CPC 16 is capable of concentrating the photons that it receives. The concentrated beam of photons leaves the CPC 16 from its base and are detected the photodetector 15. The photodetector 15 then translates the received photons into electrical pulses that are sent to a digital signals processing chip for processing, as will be explained further below.

Referring now to FIG. 4, in a further embodiment of the present invention, provided are a transparent cap 20 and a transparent lens 21, which together with the support base 12 provide protection to the plurality of WS fibres 11 arranged in, for example, the toroid shape. The clear lens 21, support base 12, and cap 20 may together be referred to as a shroud, case or cover, which protects the WS fibres in all directions from the dynamic environment in which they are to be used. The cap 20 and lens 21 may both be transparent to allow maximum light to enter the receiver and be captured by the fibres 11.

The lens 21 may be made of any suitably clear material that allows light to pass through unimpeded to be received by the enclosed WS fibres 11, such as for example, a sufficiently strong glass. The material for the clear lens 21 is sufficiently strong to protect the WS fibres 11 from damage that may occur in a hostile mining environment, such as the ocean floor or a contaminated underground mine.

In the exemplary embodiment of FIG. 4, the lens 21 is convex in shape and traverses the entire circumference of the support base 12 and the cap 20, connecting to both of them and thereby connecting both of them. A plurality of support posts 22 may also be provided that extend away from the support base 12 and connect to the cap 20 to help provide further structural support to the cap 20, thereby further protecting the encased WS fibres 11. In some embodiments, the WS fibres 11 may be enveloped between two lenses—an outer lens and an inner lens—or may be encased in the lens itself, to keep the WS fibres 11 protected from the environment and to fix them in a spaced arrangement around the circumference of the shroud.

As can also be seen in FIG. 4, in one embodiment of the present invention, the base 12 may also comprise a plurality of pumping light sources 117 or a singular disc pumping light source. These pumping light sources 117 or source are coupled to a programmable power supply as described above with reference to FIG. 1C. The pumping light sources 117 are capable of discharging photons, which then travel the length of each of the WS fibres 11 and allow for the optical amplification of any further light that strikes the WS fibres 11. The frequency of the pumping light source photons may be fixed and matched to the requirements of the WS fibres to maximize the amplification of the signal light incident on the WS fibres.

Referring now to FIGS. 5 and 6, in a further embodiment, provided also is a ring mirror 30 within the shroud. The ring mirror 30 is substantially cylindrical and contains a bore 31 at its centre. The ring mirror 30 may be made of a suitable transparent material. The bore 31 is coaxial with the aperture formed in the centre of the support base 12. The WS fibres 11 pass through the aperture in the support base 12 and pass through the space formed by the bore 31. The WS fibres 11 then bend outwards, down and away from the cap 20, terminating at the support base 12, and forming a toroid shape.

The ring mirror 30 may sit atop a lip 32 rising up from the support base 12 proximal to the aperture. The lip helps to secure the ring mirror 30 in place.

Preferably, the diameter of the bore 31 may also increase opposite the base 12 to provide a space for the WS fibres 11 to bend outwards and away from the ring mirror 30.

The outer wall 33 of the ring mirror 30 is preferably concave in shape to optimize light collection from various directions. Photons of light passing through the clear lens 21 either strike the WS fibres 11 directly or pass by the WS fibres 11 and strike the ring mirror 30. The concave outer wall 33 of the ring mirror 30 reflects concentrated photons back towards the WS fibres 11. In this manner two opportunities may be provided for incident photons to strike the WS fibres 11: first on the original pass through, and second when they are reflected and focused by the concave outer wall 33 of the ring mirror 30. In this embodiment, data capture from the optical signals may be enhanced by placing one or more WS fibres 11 at the focal point of the concave outer wall 33 of the ring mirror 30 at a given point.

Figure 7:
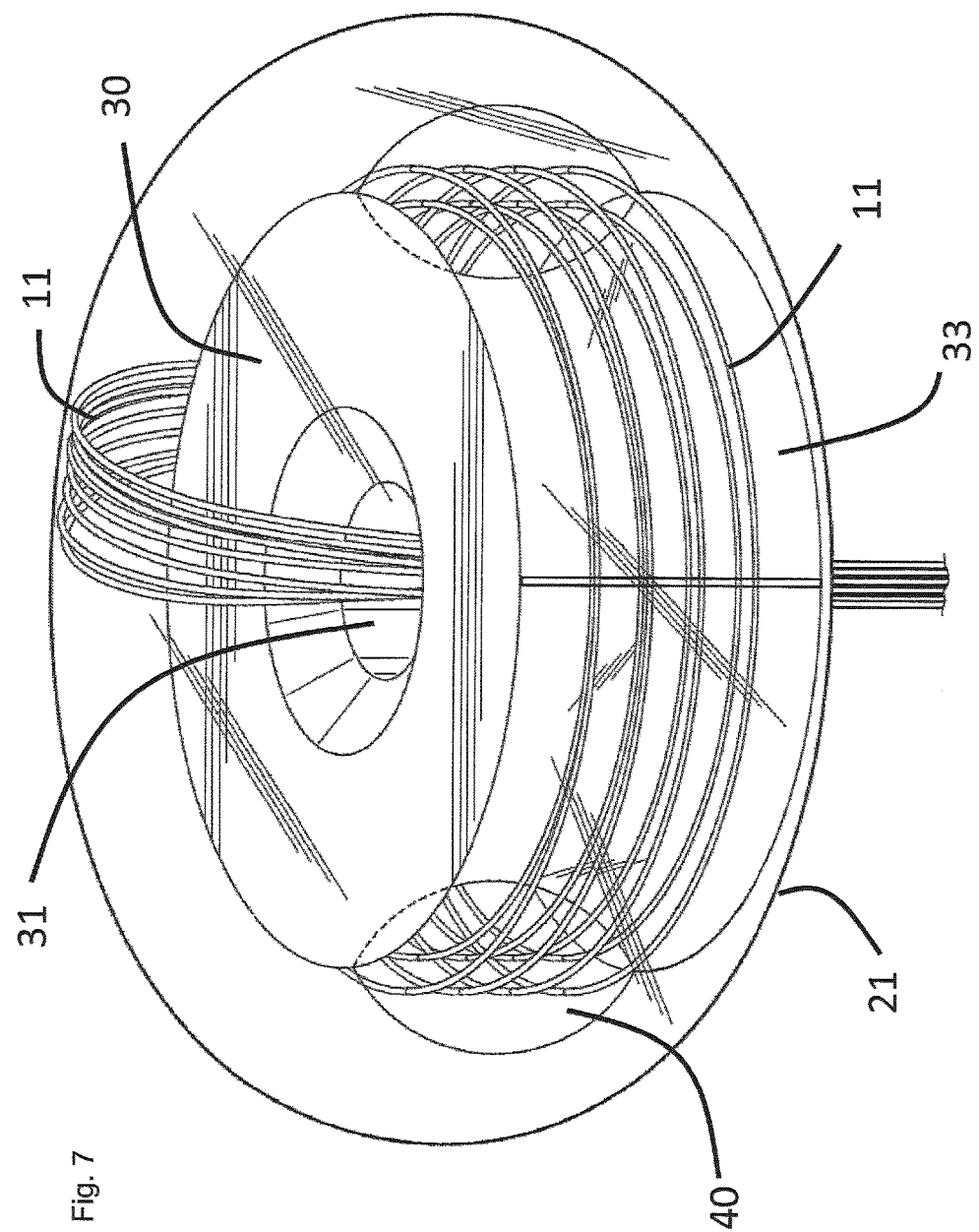
FIG. 7 is an isometric view of a further example optical sensor encased in a shroud.

With reference to the embodiment shown in FIG. 7, the WS fibres 11 are run around the circumference of the ring mirror 30, positioned substantially proximate to the focal point of its concave outer wall 33. A plurality of vanes 40 may also be provided. The vanes 40 may be made of plastic or any other suitable material. The vanes 40 are situated around the mirror 33 with holes through each vane 40 to position and maintain WS fibres 11. One end of each WS fibre 11 can terminate in a vane 40, and the other end may be run up over the mirror 30 and down through its central bore 31. Incorporated into this embodiment may also be a clear lens 21, with or without cap 20, as has been previously described.

Figure 8:
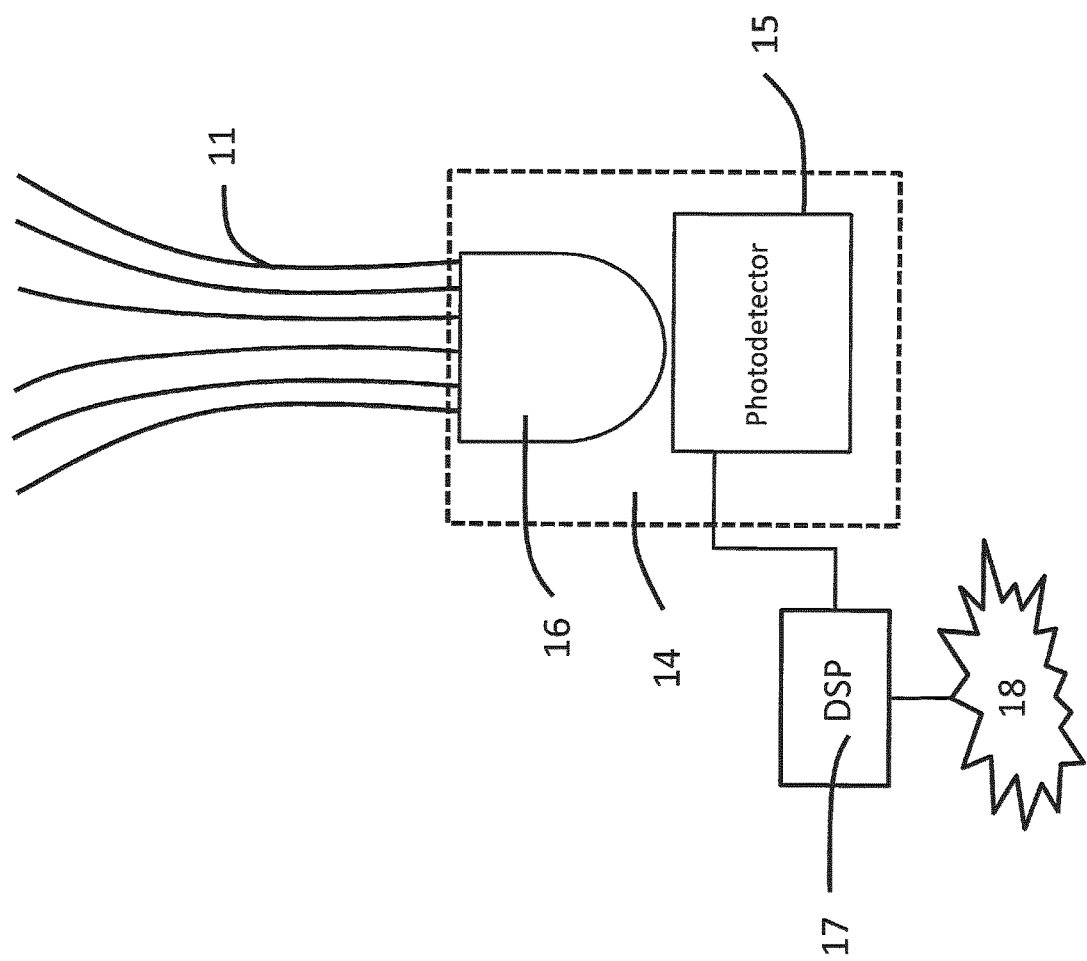
FIG. 8 is a representative view of a wave shifting (WS) fibre coupling detail.

Referring now to FIG. 8, provided is a sectional view of the base of a bundle of WS fibres 11 as they may be connected to the lens assembly 14. CPC 16 may sit within the lens assembly 14 and, as noted above, is able to focus light received from the WS fibres 11 and direct the light to a photodetector 15. The photodetector 15 may also sit within the lens assembly 14 and may be any of a photomultiplier tube, an avalanche photodiode, a pin photodiode, a silicon photomultiplier or a nanowire sensor. The CPC 16 may be coated with a fluorescent material or other filter material, such as a dichroic filter. The filter may filter or attenuate the light pumped through the fibres by the light pumping source 117 while allowing substantially the entire detected or amplified light incident on the WS fibres 11 to pass through. The coating may be placed between the CPC 16 and the fibres to which it attaches.

The electrical signal from the photodetector 15 may be amplified before it is connected to a digital signals processer (DSP) 17, which is capable of processing signals that are captured by the WS fibres 11 and passed to the CPC 16 and further to the photodetector 15. The photodetector 15 may transform light received from the CPC 16 into an electrical pulse that is then transferred to the analog to digital converters present in DSP 17. The DSP 17 may be connected to an internal network 18, such as a LAN via a connector, such as a serial bus line or Ethernet connection. In this manner, light signals received by the WS fibres 11 may be transmitted as data or Ethernet frames to the system's internal network.

Figure 9:
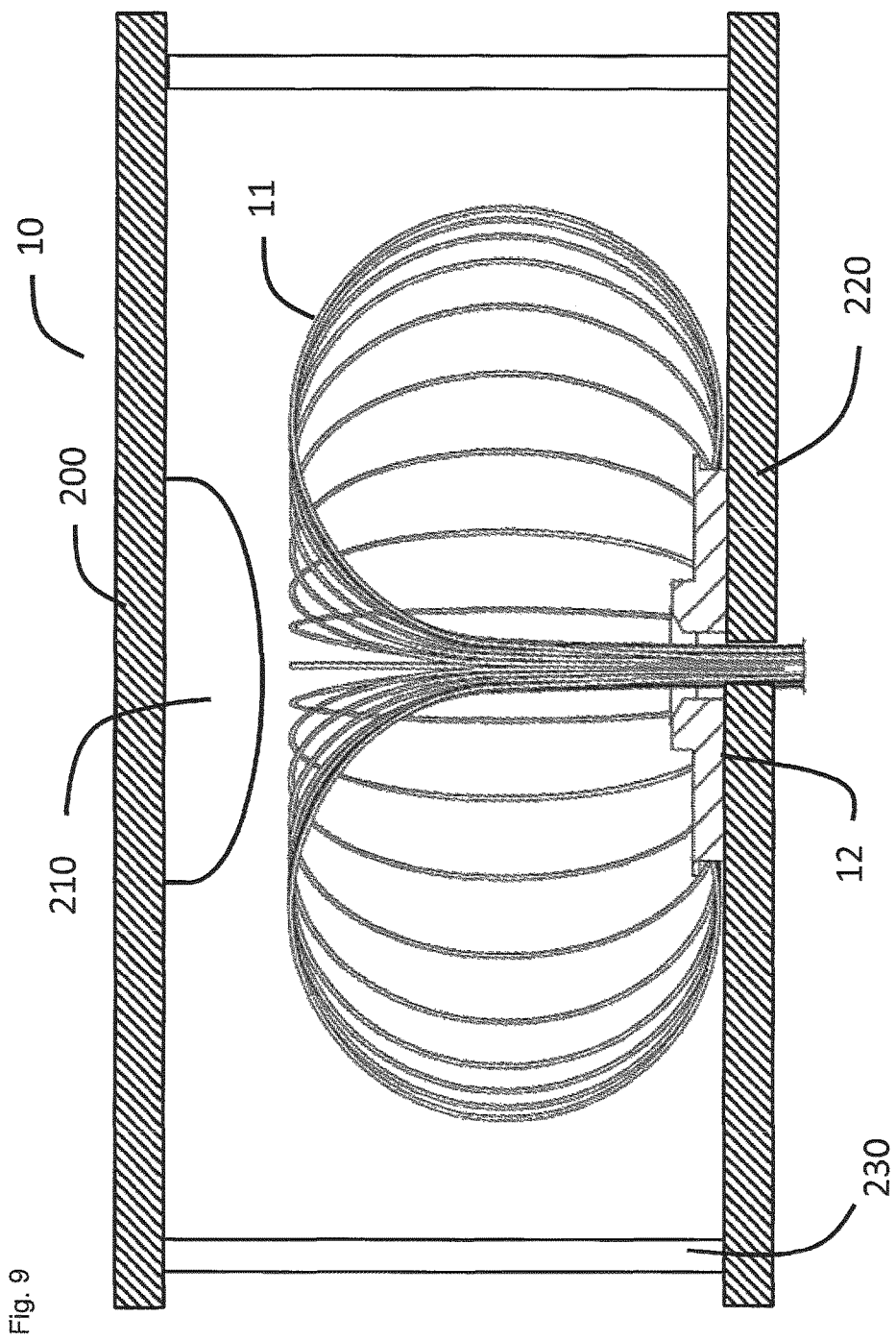
FIG. 9 is a front sectional view of a further example optical sensor encased in a cylindrical shroud.

FIG. 9 shows another embodiment with a cylindrical transparent glass 230 that encloses the WS fibres 11 in their toroid arrangement as has been described above with respect to FIGS. 1 and 2. The purpose of the transparent glass 230 is similar to that of the lens 21: to allow light to travel through its material and strike the WS fibres 11 while also protecting the WS fibres 11 from environmental damage.

Also provided with the embodiment depicted in FIG. 9 is a circular top housing 200 and a circular bottom housing 220, which are both made of a sufficiently strong material such as plastic or metal. Attached to the housing 200 in the embodiment depicted may be a hyperbolic mirror 210. The hyperbolic mirror 210 is positioned to concentrate photons received through the 230 glass to the centre of the optical sensor 10 where the density of WS fibres 11 is the highest. Attached to the bottom housing 220 may be the support 12 as was described above. The arrangement of the glass 230 and housing 200, 220 may be used where incident signal light is expected to only arrive from the sides and not from above or below, in the orientation shown in FIG. 9.

Figure 10:
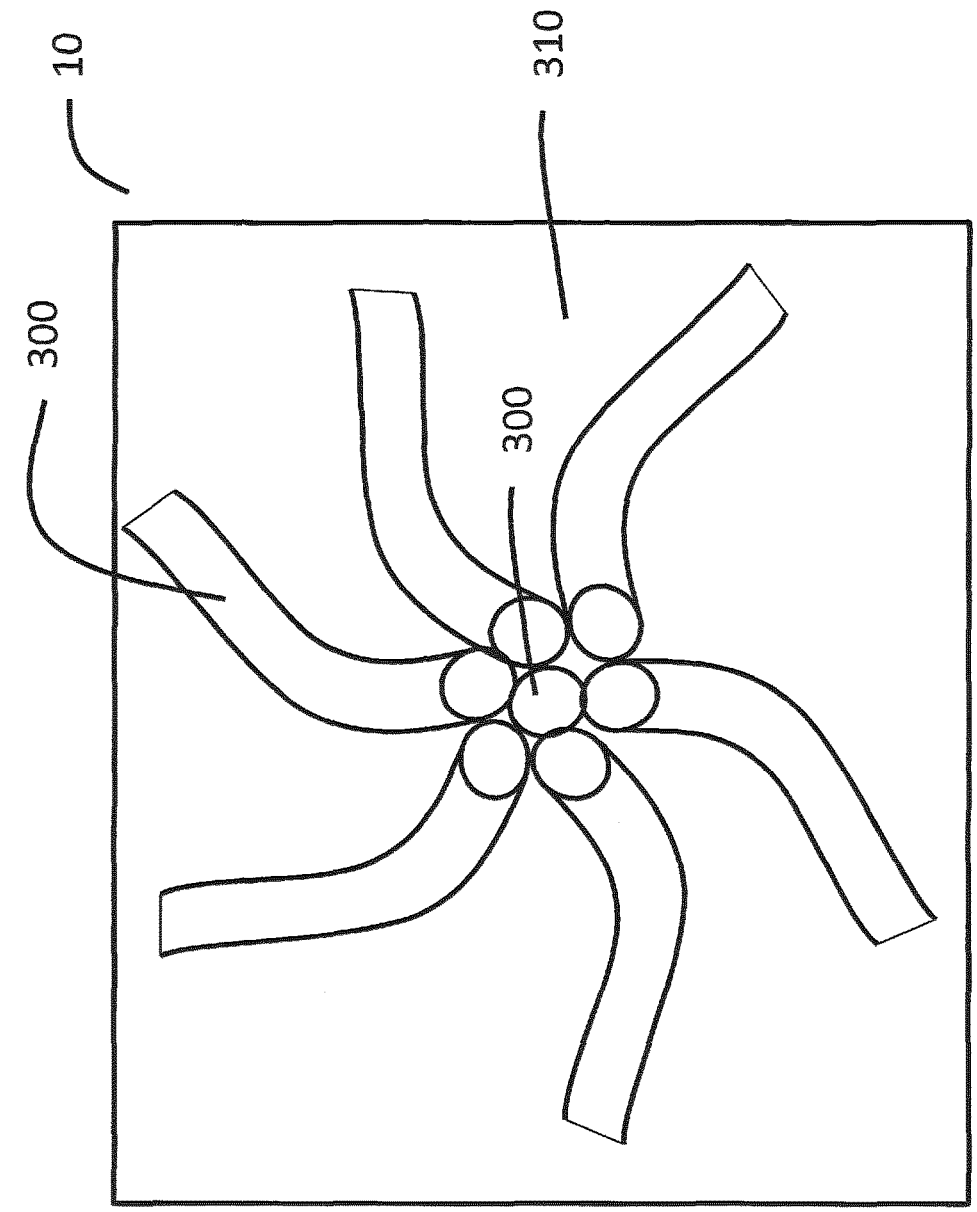
FIG. 10 is a top view of a further example optical sensor of the present invention.

FIG. 10 is a top view of an embodiment of an optical receiver 10. In this embodiment, bundles of WS fibres 300 are attached to a base 310 in a substantially spiral arrangement customized to detect the intensity level of multiple modes of orbital angular momentum (OAM) modulated light. The base 310 may be flat or may be slightly concave to maximize the phase detection of OAM modulated light. In this embodiment, each of the bundles of WS fibres 300 are coupled to a lens assembly, not shown, comprising a CPC and photodetector, functioning as described above.

In an embodiment where the base 310 is convex, the bundles of WS fibres 300 may be offset in the vertical direction by 0.5 mm or any other suitable distance from each other to optimize OAM phase detection. For example, the first fibre bundle may attach at a first fixed point, the second fibre bundle may attach at a point offset 0.5 mm in the vertical direction from the first fixed point, the next fibre bundle may be offset 1 mm from the first fixed point, and the next at 1.5 mm from the fixed point and further from other fibre bundles. In this manner, the bundles of WS fibres 300 form a three-dimensional staggered helix-like structure. In this arrangement, the bundles of WS fibres 300 are capable of capturing intensity and phase information of light modulated with multiple mode orbital angular momentum information.

Further, in the embodiment shown in FIG. 10, the optical receiver 10 can integrate multiple parallel N ring channels configured to detect intensity and phase of light emitted from LEDs (or LASERs) OAM modulated using a digital micro-mirror device (DMD) or other types of spatial light modulators (SLM), were N is the number of fibre bundles utilized to form the desire reception OAM area. In this manner, the OAM receiver have preferably less attenuation when compared with interference or multiplexing methods typically used to detect the intensity and phase of OAM modulations.

The embodiments of the optical receiver described above may be attached as communications receivers for the teleoperation of mobile vehicles including submarines, airplanes, and wheeled robots. For a submarine, the optical receiver may be attached to the nose of the submarine. An airplane may utilize an optical receiver attached, for instance, to the bottom of its fuselage.

Referring to FIGS. 11 through 14, provided is a teleoperated vehicle or robot 50 for traversing a hostile environment while controlled remotely by a worker. The robot 50 may be provided with a set of wheels to facilitate its movement. In other embodiments, the movement of the robot 50 may be facilitated by any means known in the art, including but not limited to tracks or legs.

Referring specifically to FIG. 11, provided is a robot 50 that comprises a body 51 and a support stand 52. Fastened to the support stand 50 is an optical receiver 53. The optical receiver 53 is provided as described in the embodiments above. The robot 50, by way of the optical receiver 53, is capable of receiving wireless optical communications. These communications may comprise instructions that the robot is to carry out. With the robot functioning remotely, it is preferably unnecessary to have a worker in proximity to the robot. This is particularly helpful in situations where the environment in which the robot is to operate is inhospitable to humans.

FIG. 12 shows a robot 60. Similar to robot 50, this robot 60 is also provided with a body 61 and a means to maneuver. Provided with this robot 60 is a support stand 62. An optical emitter 63 is fastened to the support stand. The optical emitter 63 comprises an array of components capable of emitting light, such as for example LEDs. The optical emitter 63 is capable of transmitting information by emitting pulses of light; this information may comprise an instruction set to be delivered to an optical receiver, such as for example receiver 53 on robot 50.

Referring now to FIGS. 13 and 14, provided are two configurations for robots 70 and 80, which combine the functionality of both an optical receiver 53 and an optical emitter 63. In the robot 70, the optical receiver 53 is placed below the optical transmitter 63. Robot 70 employs the alternative arrangement: the optical receiver 53 is placed above the optical transmitter 63. With this arrangement, a 360 degree array of LED lights may be provided that is capable of transmitting information encoded in light pulses.

In either robot 70 or robot 80, the optical receiver 53 must be isolated from the optical transmitter 63 so that information sent from the transmitter is not inadvertently captured by the receiver. Therefore, for robot 70, the optical emitter 63 may be made larger, so that its base acts as a shield. For robot 80, it would be the top of the optical emitter 63 that would act as a shield.

In a further embodiment, provided is a separating shield 90 that may be in the shape of a disc, for example, to further isolate the optical transmitter 63 from the optical receiver 53. The separating shield 90 may be flat and, therefore, co-planar with the base of the optical transmitter 63. Alternatively, the separating shield 90 may be slightly angled away from the optical emitter to maintain a line of sight with optical receivers 53 on other robots. The separating shield 90 may be made of any suitable material, such as plastic.

Data collected from atmospheric and underwater experiments using different types of LED drivers and FSO receivers was obtained from an OWC orthogonal frequency division modulator (OFDM) implemented in a Field Programmable Gate Array (FPGA), with the following communication statistics collected from it: uncoded bitrate, modulation density (bits/Hz), and signal to noise per OFDM carrier. Field tests were executed indoors (tunnels) and outdoors using a pontoon boat customized for atmospheric and underwater OWC experiments.

The OFDM modulator was implemented using a Wireless Open-Access research platform (WARP) FPGA board with custom designed AD and DA daughter boards: a Multiple-In (MI) daughter board using one octal LNA/VGA/AAF/ADC device (AD9272), and a Multiple-Out (MO) daughter board using four dual 12-Bit, 125 Msps digital to analog converters (DAC2902).

The main blocks synthesized in the FPGA were: DDR2 memory controller; PowerPC 405 processor; Pre-distorted OFDM LED modulator; OOK (on-off keying) modulator; Half-Duplex packet controller.

The following packet based OFDM modulations schemes were implemented: 1024/256/64/8-QAM, 16-APSK, QPSK and BPSK, capable of the bandwidth efficiency present in Table 1.

TABLE 1

FPGA OFDM Modulator Capabilities

| EOE Bandwidth (MHz) | Bitrate (Mbps) | Efficiency (bit/Hz) |
|---|---|---|
| 6 | 56 | 9.3 |
| 15 | 175 | 11.6 |
| 30 | 292 | 9.1 |
| 50 | 494 | 9.9 |

An LED driver for OWC communications needs to integrate the following features: Pulsed time digital modulations (OOK, Manchester, PPM, etc.); Pulsed time (framing); frequency and amplitude modulations (ASK, FSK, PSK, QAM, APSK, etc.); LED dimming for VLC applications; RGB Colour Shift Keying (CSK); Half-Duplex and Full-Duplex modes; LED temperature monitoring and over current protection.

Efficient and versatile LED drivers for OWC are not apparent from the catalogs of current leaders in Mixed Signal Products (MSLP), who typically offer only LED drivers for illumination applications. Nonlinearities and LED frequency response are main performance limiters for LED drivers. To address these problems, the inventors utilized equalization and pre-distortion schemes for LED OFDM modulation, implemented on the FPGA.

One Texas Instruments MSP430F2619 Mixed Signal Microcontroller (MSM) was used to supervise the temperature and current of the LED array that integrates a GaN control FET in an Integrated OWC Circuit (IOWCC) structure. The FPGA communicates with the IOWCC with three 50 Ohms OFDM coaxial links to support Colour Shift Keying (CSK) modulations, one Local Interconnect Network (LIN) bus to monitor and control the IOWCC features (LED BIAS point, OOK mode, analog OFDM and VLC dimming mode), and one LVDS pair to control the OFDM half-duplex framing or OOK modulations. The inventors observed that the IOWCC gives an improved frequency response when compared with previous systems that used the industry standard BIAS-T to inject the AC OFDM component in the LED serial array.

The IOWCC improved frequency response is attributed to the absence of the BIAS-T capacitor and its undesired Equivalent Series Resistance (ESR), and by programming the MSM with a full Safe Operating Area (SOA) temperature and current control strategy, to maximize the LED DC power parameter PDC in the LED frequency response model.

The teleoperation of mobile mining equipment using an OWC system benefits from wide aperture large Field of View (FOV) photon receivers, and standard reflective or refractive optical technologies do not offer efficient solutions for this purpose. The most commonly used technologies to implement large aperture FSO receivers are: large Hemispherical Photomultiplier Tubes (PMT); fish-eye lens; Compound Parabolic Concentrators (CPC); multiple detectors connected to a Received Signal Strength Indicator (RSSI) controlled selector/combiner; and, Fresnel lens.

The main limitations of these omnidirectional implementations are summarized in Table 2:

TABLE 2

| OWC Omnidirectional Receiver Technologies | |
|---|---|
| Technology | Undesired characteristics |
| PMT | fragile, price, bulky |
| Fish-eye lens | low gain, fragile |
| CPC | low acceptance angle, bulky |
| Array of sensors | price, mechanical complexity |
| Fresnel lens | bulky, narrow FOV |

Figure 15:
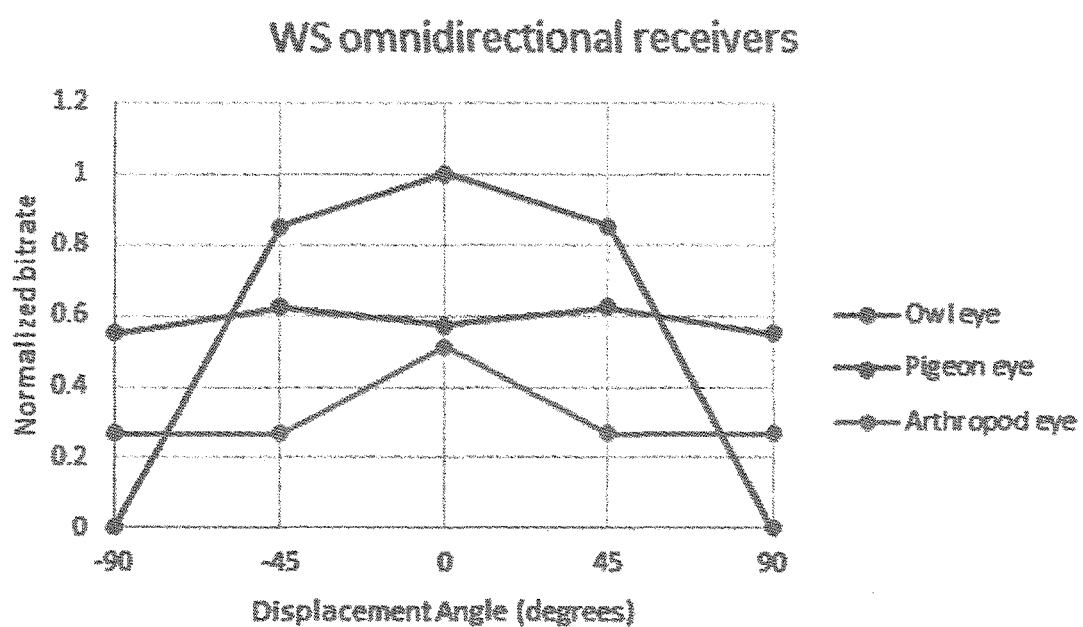
FIG. 15 graphs the biological optics of three species replicated with WS fibres.

A variety of experiments of omnidirectional optical receivers using refractive and reflective optics were undertaken, including Photodetector arrays, PMT sensors, Silicon Photomultiplier Diodes (SiPMD), and wavelength shifting (WS) fibres. The biological optics of three species (FIG. 15) were replicated using WS fibres, mimicking the field of view (FOV) of the eye of the owl, pigeon, and arthropods.

To verify the design feasibility of large aperture omnidirectional OWC receivers using WS fibres, diverse biological eye shapes were modelled and experimented. It was found that the owl eye is an optical shape effective to integrate in vehicle faces, and the pigeon or arthropod eye shaped optical receivers may provide omnidirectional reception at vehicles with one or two central points.

In the process of system modelling and prototype experimentation, a preferred setting was established for the implementation of Broadband OWC networks with the desired performance to teleoperate mobile equipment in the mining industry. Long range and high bitrates are the objectives for the implementation of OWC networks, in surface, underground and underwater mining operations. The bitrate and range of OWC networks relates to parameters that characterize the transmitter, the propagation medium, and the receiver. In the transmitter the radiant power and emission divergence are the main design parameters for selection to obtain the desired range and omnidirectional coverage. The choice for the light beam spreading varies between a low divergence laser and a 180 degrees uncollimated LED, with intermediary divergences obtained using refractive or reflective optics. The specification of the wavelength for light emission in vacuum (outer space) is restricted by the Photodetector colour responsivity (A/W), its Quantum efficiency (%), the LED or Laser diode (LD) radiometric power, and other electro-mechanical parameters. Choosing the wavelength of emission for atmosphere or underwater OWC may be more involved, because the characteristics of the medium are important, followed by customized optoelectronic design.

Figure 16:
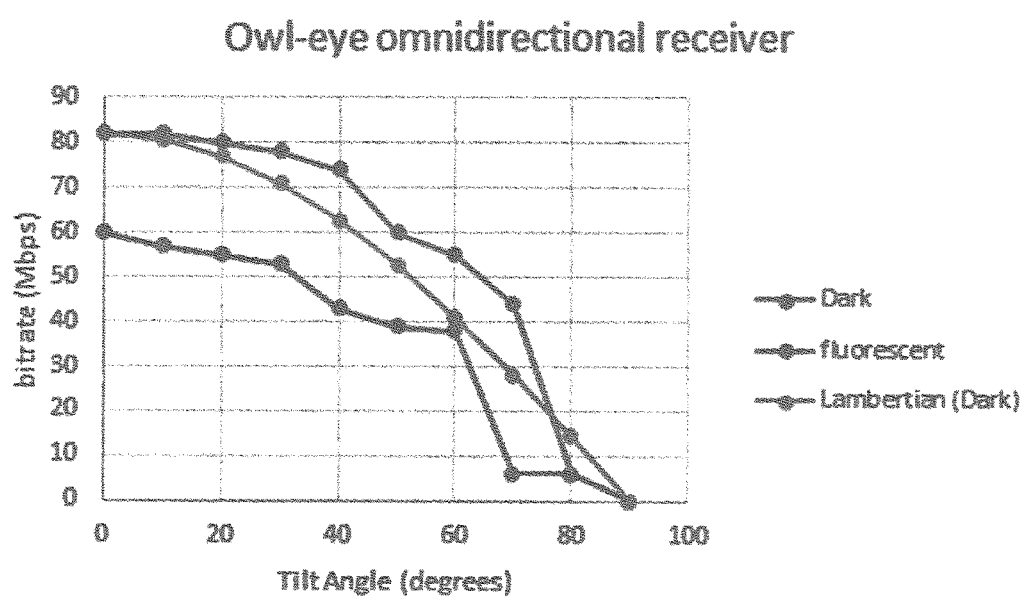
FIG. 16 graphs the results of a test run with an owl-eye omnidirectional receiver.

The experimental tests with the owl-eye omnidirectional receiver (FIG. 16) show that an optical antenna with 120 degrees vertical and 360 degrees horizontal can be designed using 3 receivers covering 120 degrees each.

Figure 17:
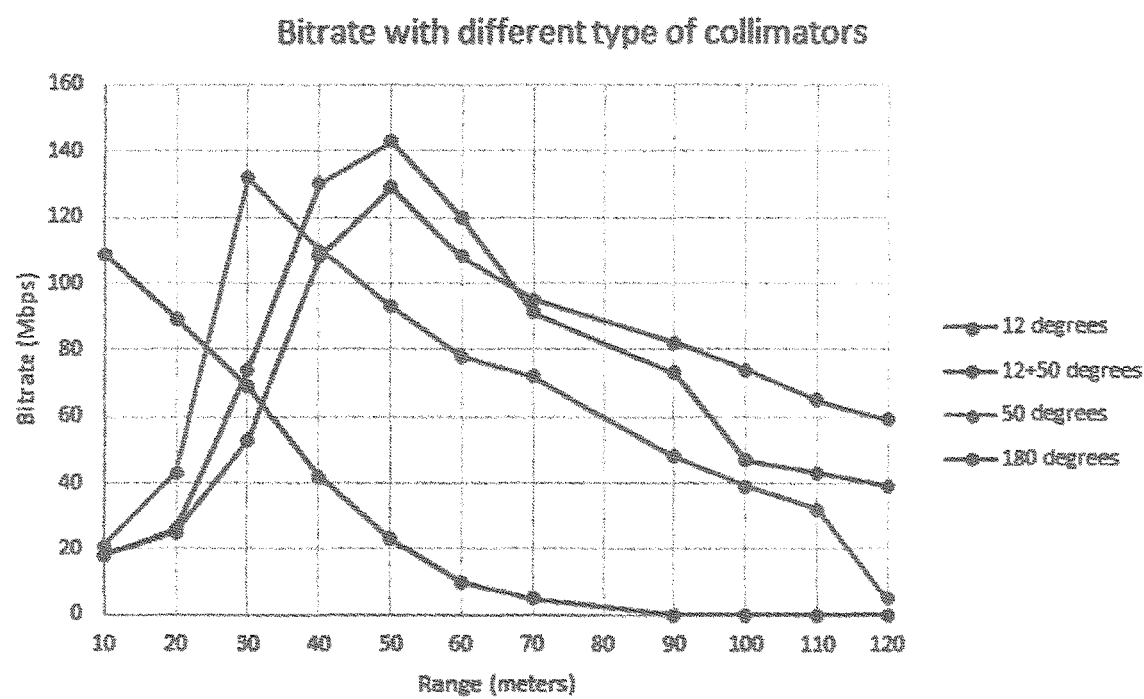
FIG. 17 graphs bitrate with different types of collimators.

The owl-eye omnidirectional receiver gives higher bitrates than IEEE 802.11 (no channel bonding) in tunnels with lengths above 120 meters (FIG. 17). An inappropriate AGC circuit causes the low bitrate between 0 and 25 meters.

The atmospheric tests show that this OWC system can replace IEEE 802.11a/b/g/n/ac radios with multiple advantages, like a versatile scalability that allows reaching 1 Km of range just by installing another 24 LED IOWCC.

OWC networks in atmospheric environments offer high availability, long ranges and high bitrates in the absence of dense fog, snow or rainfall precipitation. Underwater OWC systems have the same medium limitations as atmospheric OWC, with its performance compromised in turbid underwater environments, where an acoustic communication system can be a better solution. The developed link budget models, and experiments confirm that it is not feasible to increase the OWC range just by increasing the LED emitting power, e.g. doubling the LED power can result in an insignificant range gain because of the exponential decay of photons in absorptive mediums.

During underwater OWC experiments, it was found that at depths above 2 meters it suffers from reflection from the air-water interface when using modems with wide beam collimation. OWC experiments executed in the deepest zone of Long Lake (Ontario, Canada) demonstrated that the waters of this lake are Jerlov type-7, giving a poor transmission for light in the blue region. In a test using 4 radiometric Watts of non-collimated LED light in Long Lake waters, it was verified a maximum range below 2 meters when using 450 nm blue LEDs, and below 9 meters when using 630 nm red LEDs.

Throughout the specification, terms such as "may" and "can" are used interchangeably. Use of any particular term should not be construed as limiting the scope or requiring experimentation to implement the claimed subject matter or embodiments described herein. Further, while this disclosure may have articulated specific technical problems that are addressed by the invention(s), the disclosure is not intended to be limiting in this regard; the person of ordinary skill in the art will readily recognize other technical problems addressed by the invention(s).

A portion of the disclosure of this patent document contains material which is or may be subject to one or more of copyright, design, or trade dress protection, whether registered or unregistered. The rightsholder has no objection to the reproduction of any such material as portrayed herein through facsimile reproduction of this disclosure as it appears in the Patent and Trademark Office records, but otherwise reserves all rights whatsoever.

The invention claimed is:

1. A photon detecting apparatus, comprising:
   at least one fibre comprising:
      a first elongated layer with a first refractive index;
      a second elongated layer with a second refractive index coaxial with and surrounding the first layer, wherein the second refractive index is less than the first refractive index;
   a lens assembly, and
   a support base with at least one aperture formed in the support base wherein the at least one fibre is attached at its first end to an outer edge of the support base, the at least one fibre extends from its point of attachment away from the support base, loops back towards the support base, passes through the at least one aperture formed in the support base, and optically connects to the lens assembly.

2. The photon detecting apparatus of claim 1 wherein the lens assembly comprises:
   a compound parabolic concetrator (CPC) optically connected to the at least one fibre at an input surface and optically connected at an output surface to a photodetector.

3. The photon detecting apparatus of claim 2 wherein the first end of the at least one fibre is optically connected to a pumping light source that emits light and a filter material, located between the CPC and the at least one fibre, filters at least some of the light pumped from the at least one light pumping source through the at least one fibre.

4. The photon detecting apparatus of claim 1 wherein the at least one fibre further comprises:

a third elonged layer with a third refractive index coaxial with and surrounding the second layer wherein the third refractive index is less than the second refractive index.

5. The photon detecting apparatus of claim 1 further comprising:
a concave ring mirror containing a central bore coaxial with the aperture wherein the at least one fibre passes through the bore prior to passing through the aperture in the support base.

6. The photon detecting apparatus of claim 5 further comprising:
at least one vane connected to and extending outwardly from an outer surface of the ring mirror, the at least one vane positioned such that a space therein locates at a focal point of the ring mirror and allows the at least one fibre to pass therethrough whereby the at least one fibre then circumnavigates the ring mirror at its focal point before passing through the ring mirror's central bore.

7. The photon detecting apparatus of claim 1 wherein the first end of the at least one fibre is optically connected to at least one pumping light source that emits light.

8. The photon detecting apparatus of claim 1 further comprising
a cap; and
a transparent lens affixed to the cap and the support base; wherein the cap, lens and support base protect the at least one fibre.

9. The photon detecting apparatus of claim 8 wherein the cap is transparent.

10. The photon detecting apparatus of claim 8 wherein a hyperbolic mirror is attached to the cap to concentrate and focus photons received through the transparent lens at the at least on fibre.

11. The photon detecting apparatus of claim 1 wherein the apparatus is attached to a mobile vehicle for teleoperation of that vehicle.

12. The photon detecting apparatus of claim 11 wherein the mobile vehicle may be any one of a submarine, an airplane and a wheeled vehicle.

13. A method of teleoperating a mobile vehicle using light encoded with one or more instructions comprising:
capturing the light in at least one fibre wherein the fibre comprises:
a first elongated layer with a first refractive index;
a second elongated layer with a second refractive index coaxial with and surrounding the first layer wherein the second refractive index is less than the first refractive index
wherein the second refractive index is less than the first refractive index, which allows for captured photons to remain captured within the at least one fibre,
concentrating light from the at least one fibre with a compound parabolic concentrator, which is optically connected to the at least one fibre;
detecting the light by a photodetector optically coupled to the compound parabolic concentrator;
converting variations in the light to an electrical signal and detecting one or more instructions;
operating on the one or more instructions by the mobile vehicle.

14. A method of claim 13 wherein the at least one fibre further comprises:
a third elonged layer with a third refractive index coaxial with and surrounding the second layer wherein the third refractive index is less than the second refractive index, which allows for captured photons to remain captured within the at least one fibre.

* * * * *